Patented Sept. 1, 1953

2,650,913

UNITED STATES PATENT OFFICE 2,650,913

2,2-BIS-(TERTIARY BUTYL PEROXY) BUTANE CATALYST FOR ETHYLENE POLYMERIZATION

Thomas Boyd, Springfield, Mass., assignor to Monsanto Chemical Company, St. Louis, Mo., a corporation of Delaware No Drawing. Application March 23, 1950, Serial No. 151,551

3 Claims. (Cl. 260—94.9)

This invention relates to a process for the polymerization of ethylene.

More particularly, this invention relates to a process for the polymerization of ethylene in the presence of 2,2-bis-(tertiary butyl peroxy) butane.

Ethylene may be polymerized at temperatures between 100° C. and 400° C. under pressures up to 3000 atmospheres. Under these conditions, the polymerization is slow in the absence of oxygen and fast in the presence of restricted amounts of oxygen. By either method, the polymeric products range from oils and greases to waxy solids. The polymers are useful as lubricants, adhesives, textile impregnants, etc.

One object of this invention is to provide solid moldable polymers of ethylene.

A further object is to provide a process for producing solid moldable polymers of ethylene.

These and other objects are attained by polymerizing oxygen-free ethylene in contact with 2,2-bis(tertiary butyl peroxy) butane.

The following examples are given in illustration and are not intended as limitations on the scope of this invention. Where parts are mentioned, they are parts by weight.

Example I

Monomeric ethylene containing substantially no oxygen was charged into a stainless steel bomb containing 2,2-bis(tertiary butyl peroxy) butane as a polymerization catalyst. 100 parts of ethylene were used for each 0.1 part of catalyst. The bomb was then heated to about 260° C. under a pressure of 3000 atmospheres for about 2 hours. Pressure was then released and the reaction product removed. A 75% yield of a tough and resilient solid polymer was obtained which could be easily molded and extruded by conventional means such as injection molding, compression molding or screw extrusion to obtain transparent articles.

Example II

Monomeric ethylene containing substantially no oxygen was charged into a stainless steel bomb. The bomb was then heated to about 300° C. and a 1% solution of 2,2-bis(tertiary butyl peroxy) butane in liquid ethylene was injected into the bomb over a period of 2 hours at the rate of 0.01 part of catalyst per hour per 100 parts of ethylene. The pressure in the reaction vessel was substantially 2500 atmospheres throughout the reaction. The pressure was released at the end of the reaction and a tough solid polymer was obtained in a 60% yield. The polymer had a molecular weight of about 30,000.

The process of Example II is especially adapted to continuous polymerization by the constant addition of ethylene and ethylene solution of the catalyst to a suitable reaction vessel or tower, accompanied by the constant withdrawal of liquified polymer from the bottom of the reactor.

Example III

A pressure reactor was charged with 100 parts of anhydrous benzene containing 0.1 part of 2,2-bis(tertiary butyl peroxy) butane dissolved therein. Ethylene was then introduced into the reaction vessel under a pressure of 250 atmospheres and the temperature of the reaction vessel was raised to 120° C. Upon reaching this temperature, the ethylene pressure was raised to 600 atmospheres and polymerization was continued with constant agitation for about 4 hours. At the end of the reaction, the pressure was released and about 50% of solid ethylene polymer having a molecular weight of about 25,000 was obtained.

Example IV

A stainless steel pressure reactor was purged of oxygen and charged with 100 parts of deaerated water and 0.3 part of 2,2-bis(tertiary butyl peroxy) butane. The reactor was then charged with ethylene to a pressure of about 300 atmospheres and heated to 150° C. At this temperature, the ethylene pressure had reached 800 to 1000 atmospheres and polymerization was continued under constant agitation for about 3 hours. At the end of the reaction the pressure was released and unreacted ethylene was removed. The ethylene polymer produced by the reaction was insoluble in water and precipitated therefrom so that it could be easily recovered by simple drying processes. The polymer obtained had a molecular weight of about 20,000.

It is sometimes advantageous to conduct the process of this invention in the presence of a reducing agent. Many such materials are known and have been used in polymerization reactions. The preferred reducing materials for this invention are metallic salts of alpha,beta-unsaturated acids since this class of compounds does not produce a color or haze in the polymer produced. Examples of such compounds are copper arcylate, nickel maleate, lead methacrylate, etc. Other reducing agents which may be used are quinones, organic sulfinates, aldehydes, amines, alcohols, thio-acids, mercaptans, ascorbic acid and sulfur dioxide.

Example V

Oxygen-free ethylene was polymerized under a pressure of 1500 atmospheres at 250° C. in contact with 5 ppm. of nickel acrylate and 0.1 part of 2,2-bis(tertiary butyl peroxy) butane per 100 parts of ethylene. The reaction was completed in about 1 hour to yield a clear, hard and tough polymer which could be easily molded by conventional methods.

It is essential that the ethylene used in the process of this invention be substantially oxygen-free. Amounts of oxygen as small as 0.06% by weight easily destroy the beneficial effects of the catalysts of this invention.

Instead of preparing a homopolymer of ethylene, copolymers thereof with vinylidene compounds may be prepared. Thus, ethylene may be copolymerized with vinyl halides such as vinyl fluoride, vinyl chloride, etc.; vinyl hydrocarbons both aromatic and aliphatic such as styrene, ring-substituted alkyl styrenes, alpha-alkyl styrenes, vinyl naphthalene, vinyl diphenyl, isobutylene and other iso-olefins, butadiene, isoprene, piperylene, dimethyl butadiene; the halogen derivatives of vinyl hydrocarbons such as chlorostyrenes, fluorostyrenes, chloroprene, bromoprene; vinylidene compounds such as vinylidene chloride, vinylidene fluoride, 1,1-chlorofluoroethylene; vinyl esters including vinyl acetate, vinyl butyrate, vinyl laurate, vinyl stearate, etc.; vinyl ethers including vinyl methyl ether, vinyl ethyl ether, vinyl octyl ether, etc.; acrylic acid, acrylonitrile, acrylic esters including methyl, ethyl, propyl, phenyl, etc. acrylates, acrylamide, alpha-substituted acrylic acids, nitriles, esters and amides such as methacrylic acid, methacrylonitrile, ethyl methacrylate, methacrylamide, methyl methacrylate, atroponitrile, etc.; the acids, esters and amides of alpha,beta-ethylenically unsaturated dicarboxylic acids such as the fumaric, maleic, citraconic, itaconic, etc. acids or anhydrides, their esters and amides, etc. If a copolymer is prepared by the process of this invention it should contain more than 50% by weight of ethylene.

Example VI 70 parts of ethylene were copolymerized with 30 parts of vinyl acetate in contact with 0.1 part of 2,2-bis(tertiary butyl peroxy) butane at 200° C. and 1000 atmospheres pressure in the substantial absence of oxygen. A tough, flexible, easily moldable copolymer was obtained.

The reaction conditions which may be used vary from 50° C. to 400° C. and 150 to 3000 atmospheres pressure. The particular conditions used in combination with the amount of catalyst used determine the molecular weight and, consequently, the hardness and moldability of the polymer produced. In general, it may be said that a combination of 50° C., 3000 atmospheres pressure and 0.01 part of catalyst will produce the highest molecular weight and the hardest polymer. In fact, such conditions may result in a polymer so high in molecular weight that it is not easily molded under conventional conditions, i. e., it is necessary to substantially raise pressures and temperatures used for molding or extrusion.

The amount of catalyst used may vary from 0.01 part to 5.0 parts per 100 parts of ethylene. At the lower part of the range, polymerization is slow unless the higher temperatures are used, and the molecular weight of the polymer is relatively high. At from 3 to 5 parts, polymerization is quite rapid at even 100° C. and the product is so low in molecular weight that it approaches the lower limit of moldability. In order to obtain the most accurate control of the reaction rate and to produce an optimum range of moldable polymers, the amount of catalyst is preferably restricted to from 0.01 to 1.0 part per 100 parts of ethylene.

The reducing agent which is optional serves the purpose of activating the catalyst and increasing the reaction rate. It has little or no effect on the molecular weight of the polymer or on the physical properties thereof. It should be used in quantities ranging from 0.1 to 15 parts per million parts of ethylene.

This invention provides a simple process for preparing relatively high molecular weight ethylene polymers which are easily molded and extruded under conventional conditions. It also makes it possible to obtain ethylene polymers ranging from soft and waxy to hard and resilient solids.

It is obvious that many variations may be made in the products and processes of this invention without departing from the spirit and scope thereof as defined in the appended claims.

What is claimed is:

1. A process which comprises polymerizing 100 parts of substantially oxygen-free ethylene at from 260° C. to 300° C. at a pressure of from 3000 to 2500 atmospheres pressure for two hours in contact with from 0.1 to 0.01 part of 2,2-bis(tertiary butyl peroxy) butane, whereby from 75 to 60% yields of polyethylene are obtained.

2. A process which comprises polymerizing 100 parts of substantially oxygen-free ethylene at 260° C. at a pressure of 3000 atmospheres for two hours in contact with 0.1 part of 2,2-bis(tertiary butyl peroxy) butane whereby a 75% yield of polyethylene is obtained.

3. A process which comprises polymerizing 100 parts of substantially oxygen-free ethylene at 200° C. at a pressure of 2500 atmospheres for two hours in contact with 0.01 part of 2,2-bis(tertiary butyl peroxy) butane, whereby a 60% yield of polyethylene is obtained.

THOMAS BOYD.

References Cited in the file of this patent

UNITED STATES PATENTS

| Number | Name | Date |
|---|---|---|
| 2,425,638 | Peterson | Aug. 12, 1947 |
| 2,455,569 | Dickey | Dec. 7, 1948 |
| 2,543,635 | Loritsch | Feb. 27, 1951 |